US006913135B2

(12) United States Patent
Borderi et al.

(10) Patent No.: US 6,913,135 B2
(45) Date of Patent: Jul. 5, 2005

(54) METHOD AND DEVICE FOR FORMING GROUPS OF PRODUCTS

(75) Inventors: Luca Borderi, Sasso Marconi (IT); Mario Spatafora, Bologna (IT)

(73) Assignee: G.D Societa' per Azioni, Bologna (IT)

( * ) Notice: Subject to any disclaimer, the term of this patent is extended or adjusted under 35 U.S.C. 154(b) by 0 days.

(21) Appl. No.: 10/632,128

(22) Filed: Jul. 31, 2003

(65) Prior Publication Data

US 2004/0079049 A1 Apr. 29, 2004

(30) Foreign Application Priority Data

Aug. 8, 2002 (IT) .................................... BO2002A0526

(51) Int. Cl.[7] ................................................ B65G 47/26
(52) U.S. Cl. .................. 198/460.2; 198/812; 198/418.7
(58) Field of Search ........................... 198/418.7, 418.8, 198/588, 594, 460.2, 812, 817

(56) References Cited

U.S. PATENT DOCUMENTS 2,932,376 A * 4/1960 Millington .................. 198/812
4,684,008 A * 8/1987 Hayashi et al. ............. 198/436
4,881,635 A * 11/1989 Raschke .................. 198/460.2
4,961,488 A * 10/1990 Steeghs ................... 198/460.2
5,060,454 A 10/1991 Benz
5,322,154 A * 6/1994 Lenherr ................... 198/460.2
5,547,004 A * 8/1996 Fransen ................... 198/460.2
5,720,149 A * 2/1998 Stimpfl ........................ 53/244
5,772,005 A * 6/1998 Hansch ....................... 198/594

FOREIGN PATENT DOCUMENTS

CH 682385 9/1993
GB 2330600 4/1999

OTHER PUBLICATIONS

Espacenet English Abstract of CH 682,385.

* cited by examiner

*Primary Examiner*—James R. Bidwell
(74) *Attorney, Agent, or Firm*—Ladas & Parry

(57) ABSTRACT

A method and device for forming groups of products, whereby a substantially continuous input succession of products is fed to an input of an endless conveyor, which has a conveying branch and a return branch extending between the input and an output, and which has a variable speed drive member operated to impart a variable speed to the conveyor at the input, and to generate, along the conveying branch, a succession of equally spaced on-line gaps defining a succession of groups of products; the conveying and return branches are both engaged by a powered compensating device for varying the lengths of the conveying and return branches in complementary manner, so as to maintain a constant speed of the conveyor at the output and compensate for any gaps in the input succession. (FIG. 1)

24 Claims, 3 Drawing Sheets

1
5
6
7
8
12
13
14
15
16
17
18
19
20
21
22
23
24
25
26
27
28
28a
29
30
31
32
33
34 a)
b)

METHOD AND DEVICE FOR FORMING GROUPS OF PRODUCTS

The present invention relates to a method of forming groups of products.

The present invention may be used to particular advantage in the tobacco industry for processing cigars coming off a production machine, to which the following description refers purely by way of example.

BACKGROUND OF THE INVENTION

In the tobacco industry, cigars coming off a production machine are normally collected in containers, from which they are removed manually and divided into groups, each comprising a given number of cigars; and the groups are then placed inside boxes in one or more superimposed layers to form respective boxes of cigars.

Besides employing considerable labour, the above method is normally time-consuming and expensive, and may result in damage to the cigars.

SUMMARY OF THE INVENTION

It is an object of the present invention to provide a straightforward, low-cost method of dividing a succession of products into a succession of groups, each containing a given number of products, to facilitate boxing of the products.

According to the present invention, there is provided a method of forming groups of products, as claimed in Claim 1 and, preferably, in any one of the following Claims depending directly or indirectly on Claim 1.

The present invention also relates to a device for forming groups of products.

According to the present invention, there is provided a device for forming groups of products, as claimed in Claim 8 and, preferably, in any one of the following Claims depending directly or indirectly on Claim 8.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
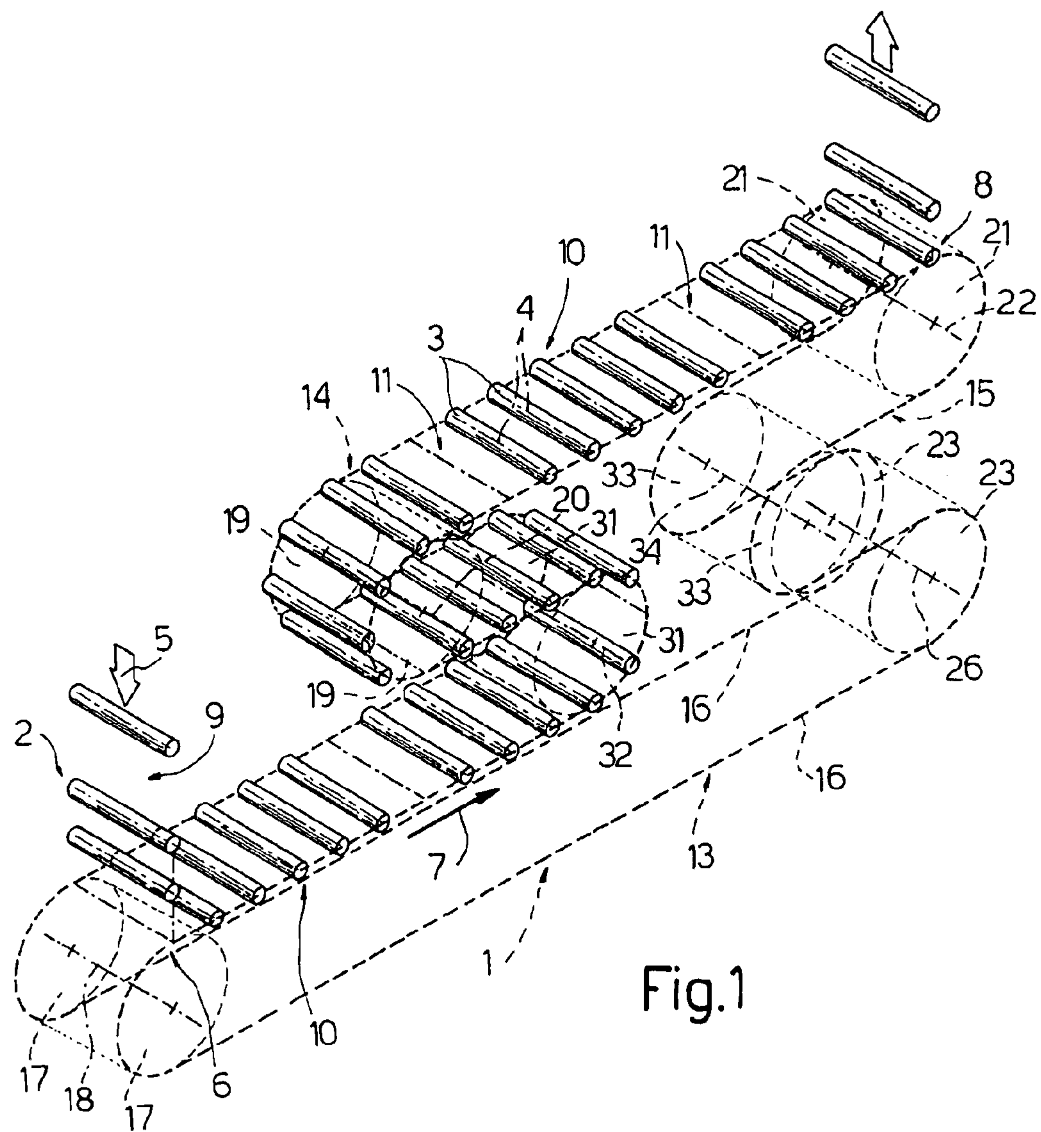
FIG. 1 shows an operating diagram in perspective of a preferred embodiment of the device according to the present invention.

Number 1 in FIG. 1 indicates as a whole a conveying device for receiving, at an input 6, a continuous input succession 2 of cigars 3 arranged with their respective longitudinal axes 4 crosswise to their feed direction 5. Cigars 3 in input succession 2 may obviously be fed to input 6 by a conveyor (not shown), or by a transfer device (not shown) for feeding cigars 3 to input 6 one at a time at a given constant rate.

Conveying device 1 feeds cigars 3 to an output 8 in a travelling direction 7 also crosswise to longitudinal axes 4; compensates for any accidental input gaps 9 in input succession 2, each caused by a missing cigar 3; and divides cigars 3 into groups 10, each defined, in the example shown, by a succession of five cigars 3, and each separated from each adjacent group 10 by an on-line gap 11 corresponding to a missing cigar 3.

Figure 2:
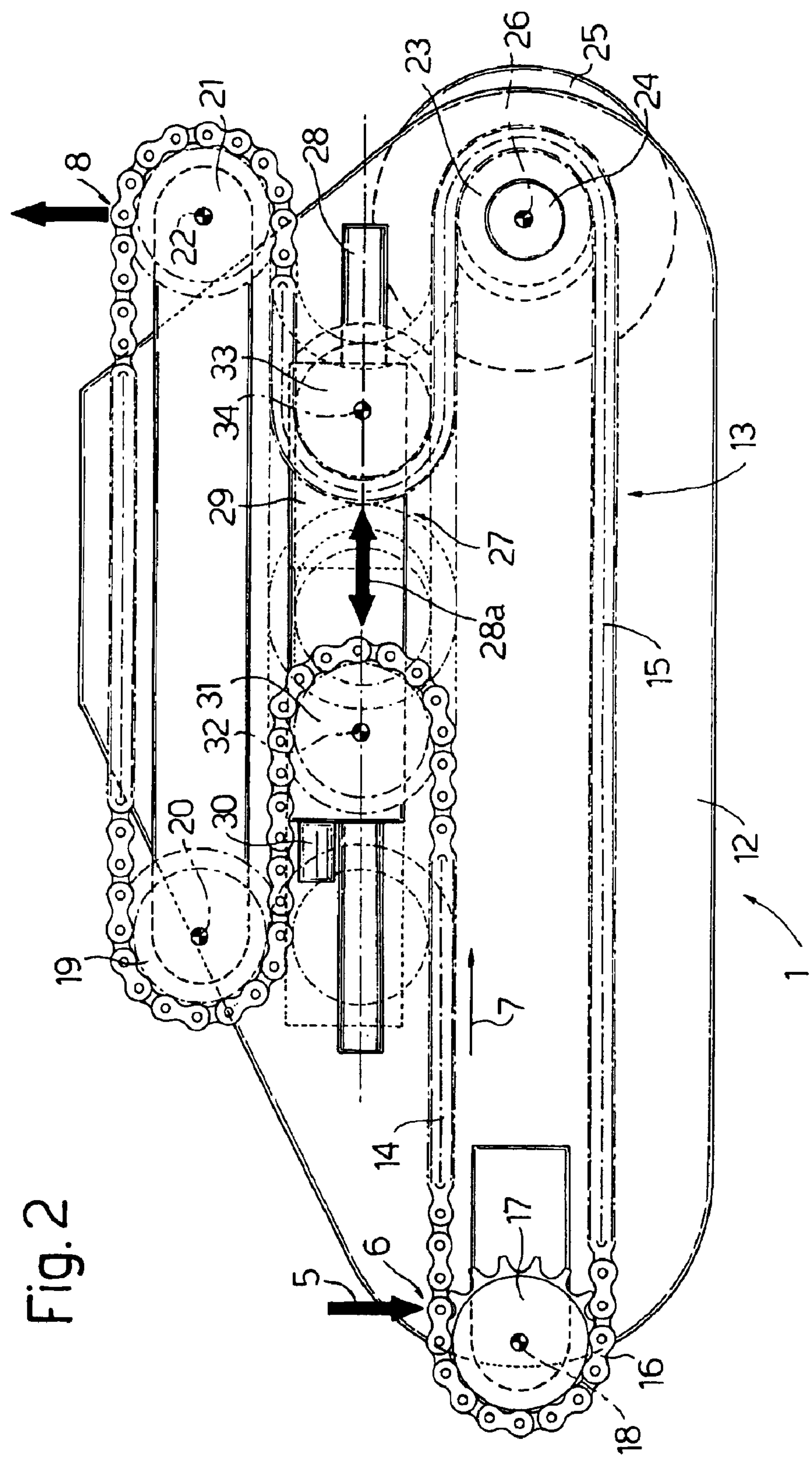
FIG. 2 shows a schematic side view, with parts removed for clarity, of the FIG. 1 device.

As shown in FIG. 2, conveying device 1 comprises a plate frame 12 in a plane parallel to travelling direction 7 and crosswise to longitudinal axes 4; and a conveyor 13 comprising a conveying branch 14 extending in travelling direction 7 from input 6 to output 8, and a return branch 15 extending from output 8 to input 6. Conveyor 13 comprises an elongated conveying member defined by two facing endless chains 16 looped about a number of pairs of sprockets meshing with chains 16 and supported for rotation by frame 12.

More specifically, said pairs of sprockets comprise a first pair of sprockets 17 fitted to frame 12 to rotate idly about a common axis 18 parallel to longitudinal axes 4 and located at input 6; a second pair of sprockets 19 fitted to frame 12 to rotate idly about a common axis 20 parallel to axis 18 and located at an intermediate point along conveying branch 14; a third pair of sprockets 21 fitted to frame 12 to rotate idly about a common axis 22 parallel to axis 18 and located at output 8; and a fourth pair of sprockets 23, which are fitted to an output shaft 24 of a "brushless" motor 25 fitted to frame 12, and rotate with shaft 24 about an axis 26 parallel to axis 18 and located at an intermediate point along return branch 15.

In the example shown, axes 18, 20, 22 and 26 are located successively at the vertices of a trapezium, with axes 18 and 26 located at the opposite ends of the major base of the trapezium, and axes 18 and 22 located at the opposite ends of a diagonal of the trapezium.

With reference to FIG. 2, conveying device 1 also comprises a compensating device 27, in turn comprising a guide 28 fitted to frame 12 in a fixed position between sprockets 17 and 23 on one side and sprockets 19 and 21 on the other, and extending in a direction **28*a* parallel to a plane defined by axes 18 and 26 and substantially crosswise to conveying branch 14 and return branch 15; and a slide 29 mounted to slide along guide 28, and which is run along guide 28 by a "brushless" motor 30 controlling a rack-and-pinion coupling (not shown) interposed between slide 29 and guide 28. Compensating device 27 also comprises a first pair of sprockets 31 fitted to slide 29 to rotate idly about a common axis 32 parallel to axis 18, and externally engaging a portion of conveying branch 14 extending between sprockets 17 and 19; and a second pair of sprockets 33 fitted to slide 29 to rotate idly about a common axis 34 parallel to axis 18, and externally engaging a portion of return branch 15 extending between sprockets 21 and 23**.

Conveyor 13 is fitted with a succession of cigar-holder units 35 interposed between and equally spaced along chains 16. Each cigar-holder unit 35 comprises two opposite, coaxial gripping members 36, each of which comprises a cylindrical rod 37 parallel to axis 18 and mounted to slide through a respective tubular link-retaining pin 38 of respective chain 16, and through a hole formed through the end wall of a cylindrical cup 39 integral with one end of relative pin 38 and projecting, coaxially with relative rod 37, from relative chain 16 towards the other chain 16.

An inner end of rod 37 projects from the open end of relative cup 39, and is force-fitted inside a dead axial end hole 40 of a relative cylindrical gripping head 41 coaxial with rod 37 and having, on the end facing the other chain 16, a conical seat 42 open on the side facing the other chain 16 and for receiving a respective tapered end 43 of a respective cigar 3 positioned with its longitudinal axis 4 coaxial with rod 37. A helical spring 44, coaxial with rod 37, is compressed between gripping head 41 and relative cup 39, and is housed, at one end, inside relative cup 39, and, at the other end, inside an annular groove 45 formed about relative hole 40 and coaxial with rod 37.

An outer end of rod 37 projects from the end of relative pin 38 opposite the end connected to relative cup 39, and is fitted on its free end with a tappet 46.

In each cigar-holder unit 35, the length of rods 37 and relative springs 44 is such as to enable relative gripping heads 41 to move—in opposition to relative springs 44 and when outward axial thrust is exerted on relative rods 37—from a normal closed gripping position (FIG. 3*b*), wherein relative gripping heads 41 are separated by a distance smaller than the length of cigar 3, to an open position (FIG. 3*a*), wherein relative gripping heads 41 are separated by a distance greater than the length of cigar 3.

Immediately upstream from input 6, and similarly (in a manner not shown) through output 8, the axial position of rods 37 of each chain 16 is controlled by a cam device 47 cooperating successively with tappets 46 of relative rods 37 to exert said axial thrust successively on rods 37 and move relative gripping heads 41 temporarily from the closed to the open position.

Figure 3:
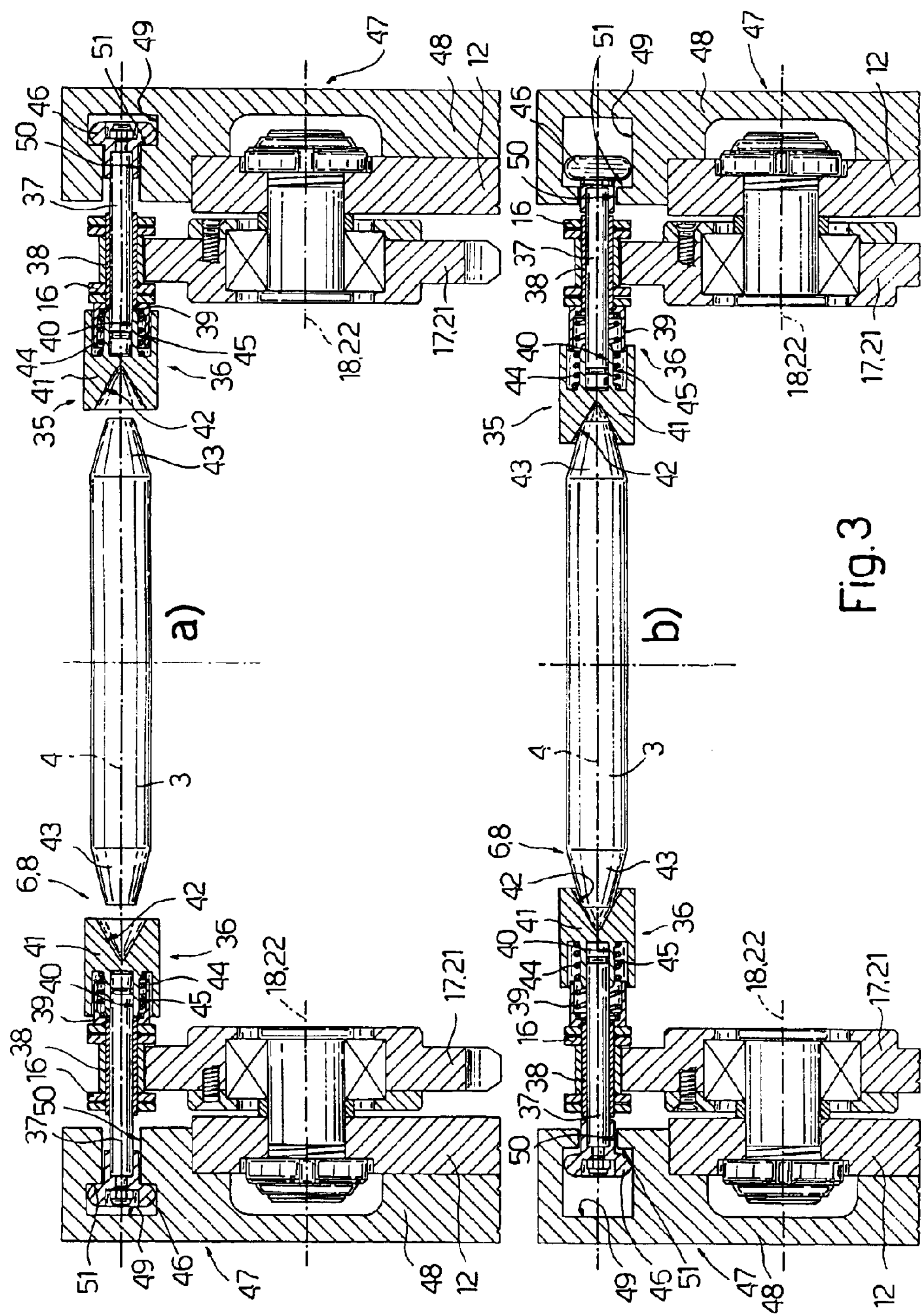
FIG. 3 shows a larger-scale section of a FIG. 2 detail in two distinct operating positions.

As shown in FIG. 3, each cam device 47 comprises a plate 48 fitted integrally to frame 12 and having an inner channel 49, which is open at the ends, is travelled along by tappets 46, and communicates externally along its whole length via a slot 50 formed through the surface of plate 48 facing relative chain 16, and through an undulated lateral surface 51 of channel 49. Surfaces 51 of plates 48 at input 6 are so shaped as to move relative tappets 46 gradually outwards to open units 35 immediately upstream from input 6 and close them just past input 6. Similarly, surfaces 51 of plates 48 at output 8 are so shaped as to move relative tappets 46 gradually outwards to open units 35 as they move through output 8, and close them just past output 8.

In actual use, motor 25 is normally operated at constant speed to feed cigar-holder units 35 to input 6 at the same rate at which cigars 3 in input succession 2 are fed to input 6. As the last cigar 3 in each group 10 is loaded on to conveyor 13, motor 25 is temporarily accelerated, so that, in the time lapse between the arrival of the last cigar 3 in group 10 and arrival of the next cigar 3, the portion of conveyor 13 travelling through input 6 is fed through by an amount equal to twice the spacing of cigar-holder unit 35, thus forming, on conveyor 13, a gap 11 corresponding to a vacant cigar-holder unit 35 and separating two adjacent groups 10.

As motor 25 is accelerated, motor 30 sharply accelerates slide 29 to adjust the lengths of conveying branch 14 and return branch 15 in complementary manner, and so maintain a constant travelling speed V1 of conveyor 13 through output 8. In the example shown, in response to each acceleration of motor 25, slide 29 is moved sharply to the right in FIG. 2 to shorten return branch 15 and accordingly lengthen conveying branch 14.

During the time taken to load the next complete group 10, the sharp movement of slide 29 is followed by a slow movement of slide 29 in the opposite direction, i.e. to the left in FIG. 2, owing to the fact than, when motor 25 operates at constant speed, i.e. when loading group 10, conveyor 13 moves through input 6 at a constant speed V2 slower than constant speed V1. That is, if each group 10 comprises n cigars 3, in the time taken by a corresponding n number of cigar-holder units 35 to travel through input 6 at constant speed V2, (n+1) cigar-holder units 35 travel through output 8 at constant speed V1. Motor 30 is therefore operated to compensate for this difference in speed by gradually shortening conveying branch 14 and lengthening return branch 15 in complementary manner.

The two movements—sharp rightward to compensate for acceleration of motor 25, and slow leftward due to the difference between V1 and V2—equal out so that slide 29 oscillates at all times about the same position along guide 28.

When a gap 9 in input succession 2 is detected, gap 9 is normally compensated on reaching input 6, either by temporarily arresting motor 25, if the missing cigar 3 is one within a relative group 10, or by maintaining a constant speed of motor 25, if gap 9 corresponds to a gap 11.

If gap 9 is compensated by temporarily arresting motor 25, motor 30 is operated to move slide 29 sharply to the left to keep speed V1 constant. This leftward movement of slide 29 is not recovered during operation of conveying device 1, so that, after a given number of gaps 9 are compensated, slide 29 eventually reaches a leftward limit stop, which arrests motor 25 and cuts off supply of input succession 2. Sprockets 23 are then made idle, sprockets 17 are locked by a brake not shown, and motor 30 is operated to move slide 29 back to the right-side position.

What is claimed is:

1. A method of forming groups of products, the method comprising the steps of:

feeding a substantially continuous input succession (2) of said products (3) to an input (6) of an endless conveyor (13), which comprises a single flexible elongated conveying member (16) and extends through said input (6) and an output (8), which define, on the conveyor (13), a conveying branch (14) and a return branch (15) of respective lengths;

coupling, at said input (6), the products (3) to relevant product-holder units (35), which are carried by the flexible elongated conveying member (16) and are equally spaced along the conveyor flexible elongated conveying member (16);

maintaining each product (3) coupled to the same product-holder unit (35) from said input (6) to said output (8) and along the entire conveying branch (14);

separating, at said output (8), the products (3) from the product-holder units (35);

imparting to said conveyor (13) a variable first traveling speed to generate, at said input (6), a succession of equally spaced on-line gaps (11), each corresponding to a relative vacant product-holder unit (35), and to define, along said conveying branch (14), a succession of groups (10) of products (3), each separated from each adjacent said group (10) by a said on-line gap (11); and varying the lengths of said conveying and return branches (14, 15) in complementary manner to impart to said conveyor (13) a constant second speed at said output (8).

2. A method as claimed in claim 1, and comprising the further step of varying the lengths of said conveying and return branches (14, 15) in complementary manner to vary said first speed and compensate for any input gaps (9) in said input succession (2).

3. A method as claimed in claim 2, wherein said first speed is temporarily zeroed at said input (6) and simultaneously with the presence, at said input (6), of a said input gap (9).

4. A method as claimed in claim 1, wherein said first speed is imparted by a variable-speed motor (25) connected to said return branch (15).

5. A method as claimed in claim 4, wherein the lengths of said conveying and return branches (14, 15) are varied in complementary manner by moving said conveying and return branches (14, 15) transversely and in the same direction.

6. A method as claimed in claim 5, wherein the lengths of said conveying and return branches (14, 15) are varied in complementary manner by moving said conveying and return branches (14, 15) by means of a first and, respectively, a second rotary transmission member (31, 33) carried by a common support (29) movable transversely with respect to the conveying and return branches (14, 15).

7. A method as claimed in claim 6, wherein said second rotary transmission member (33) engages said return branch (15) between said output (8) and a point of connection to said motor (25).

8. A device for forming groups of products, the device comprising an endless conveyor (13) having a single flexible elongated conveying member (16) and an input (6) and an output (8), which define, along the conveyor (13), a conveying branch (14) and a return branch (15) of respective lengths; wherein said conveyor (13) receives, at said input (6), a substantially continuous input succession (2) of said products (3);

a number of product-holder units (35) which are carried by the flexible elongated conveying member (16) and are equally spaced along the conveyor flexible elongated conveying member (16); wherein each product-holder unit (35) receives a relevant product (3) at said input (6), holds the same product (3) from said input (6) to said output (8), and release the product (3) at said output (8);

first actuating means (25) for imparting to said conveyor (13) a variable first travelling speed, and for generating, at said input (6), a succession of equally spaced on-line gaps (11), each defined by a relative vacant product-holder unit (35) and separating two adjacent said groups (10) of products (3) along said conveying branch (14); and second actuating means (27) for varying the lengths of said conveying and return branches (14, 15) in complementary manner to impart to said conveyor (13) a constant second speed at said output (8).

9. A device as claimed in claim 8, wherein said first actuating means (25) comprise a "brushless" motor (25).

10. A device as claimed in claim 8, wherein said conveyor (13) comprises first rotary transmission means (23) connected to said first actuating means (25); a number of idle second rotary transmission means (17, 19, 21); and an elongated conveying member (16) looped about said first and second rotary transmission means (23, 17, 19, 21).

11. A device as claimed in claim 10, wherein said first rotary transmission means (23) are connected to the return branch (15).

12. A device as claimed in claim 8, wherein said second actuating means (27) comprise a powered support (29) movable in a direction **(28*a*) substantially crosswise to said conveying and return branches (14, 15); and a further two rotary transmission means (31, 33) fitted idly to said support (29), and of which a first (31) engages said conveying branch (14), and a second (33) engages said return branch (15)**.

13. A device as claimed in claim 12, wherein said second further rotary transmission means (33) engages said return branch (15) between said output (8) and said first rotary transmission means (23).

14. A device as claimed in claim 12, wherein one (19) of said second rotary transmission means (17,19,21) engages an intermediate portion of said conveying branch (14), and is located on the opposite side of said first further rotary transmission means (31) to said input (6).

15. A device as claimed in claim 10, wherein said elongated conveying member (16) comprises two side by side chains (16); and said rotary transmission means (17, 19, 21, 23) and said further rotary transmission means (31, 33) each comprise two coaxial sprockets, each meshing with a respective said chain (16); each said product-holder unit (35) being located between said two chains (16) and crosswise to the chains (16).

16. A device as claimed in claim 8, wherein a central portion of said conveying branch (14) is arranged according to an "S" shape.

17. A method of forming groups of products, the method comprising the steps of:

feeding a substantially continuous input succession (2) of said products (3) to an input (6) of an endless conveyor (13), which extends through said input (6) and an output (8), which define, on the conveyor (13), a conveying branch (14) and a return branch (15) of respective lengths;

coupling, at said input (6), the products (3) to relevant product-holder units (35), which are carried by the conveyor (13) and are equally spaced along the conveyor (13);

separating, at said output (8), the products (3) from the product-holder units (35);

imparting to said conveyor (13) and by a variable-speed motor (25) connected to said return branch (15)a variable first travelling speed to generate, at said input (6), a succession of equally spaced on-line gaps (11), each corresponding to a relative vacant product-holder unit (35), and to define, along said conveying branch (14), a succession of groups (10) of products (3), each separated from each adjacent said group (10) by a said on-line gap (11); and varying the lengths of said conveying and return branches (14, 15) in complementary manner to impart to said conveyor (13) a constant second speed at said output (8) and by moving said conveying and return branches (14, 15) transversely and in the same direction by means of a first and, respectively, a second rotary transmission member (31, 33) carried by a common support (29) movable transversely with respect to the conveying and return branches (14, 15).

18. A method as claimed in claim 17, wherein said second rotary transmission member (33) engages said return branch (15) between said output (8) and a point of connection to said motor (25).

19. A device for forming groups of products, the device comprising:

an endless conveyor (13) having an input (6) and an output (8), which define, along the conveyor (13), a conveying branch (14) and a return branch (15) of respective lengths; wherein said conveyor (13) receives, at said input (6), a substantially continuous input succession (2) of said products (3), and comprises a number of product-holder units (35) equally spaced along the conveyor (13);

a number of product-holder units (35) which are carried by the conveyor (13) and are equally spaced along the conveyor (13);

first actuating means (25) for imparting to said conveyor (13) a variable first travelling speed, and for generating, at said input (6), a succession of equally spaced on-line gaps (11), each defined by a relative vacant product-holder unit (35) and separating two adjacent said groups (10) of products (3) along said conveying branch (14); and second actuating means (27) for varying the lengths of said conveying and return branches (14, 15) in complementary manner to impart to said conveyor (13) a constant second speed at said output (8);

wherein said conveyor (13) comprises first rotary transmission means (23) connected to said first actuating means (25); a number of idle second rotary transmission means (17, 19, 21); and an elongated conveying member (16) looped about said first and second rotary transmission means (23, 17, 19, 21).

20. A device as claimed in claim 19, wherein said first rotary transmission means (23) are connected to the return branch (15).

21. A device as claimed in claim 19, wherein said second actuating means (27) comprise a powered support (29) movable in a direction (28*a*) substantially crosswise to said conveying and return branches (14, 15); and a further two rotary transmission means (31, 33) fitted idly to said support (29), and of which a first (31) engages said conveying branch (14), and a second (33) engages said return branch (15).

22. A device as claimed in claim 21, wherein said second further rotary transmission means (33) engages said return branch (15) between said output (8) and said first rotary transmission means (23).

23. A device as claimed in claim 21, wherein one (19) of said second rotary transmission means (17, 19, 21) engages an intermediate portion of said conveying branch (14), and is located on the opposite side of said first further rotary transmission means (31) to said input (6).

24. A device as claimed in claim 19, wherein said elongated conveying member (16) comprises two side by side chains (16); and said rotary transmission means (17, 19, 21, 23) and said further rotary transmission means (31, 33) each comprise two coaxial sprockets, each meshing with a respective said chain (16); each said product-holder unit (35) being located between said two chains (16) and crosswise to the chains (16).

* * * * *